United States Patent
Lee et al.

(10) Patent No.: US 9,342,515 B2
(45) Date of Patent: May 17, 2016

(54) DEVICE AND METHOD FOR SEARCHING FOR AN E-BOOK VIA E-BOOK CATEGORIES IN A VIRTUAL BOOKSHELF IN A PORTABLE TERMINAL

(75) Inventors: Ji-Woo Lee, Gumi-si (KR); Sung-Hyun Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 831 days.

(21) Appl. No.: 13/177,067

(22) Filed: Jul. 6, 2011

(65) Prior Publication Data

US 2012/0137245 A1    May 31, 2012

(30) Foreign Application Priority Data

Nov. 26, 2010  (KR) .................. 10-2010-0118581

(51) Int. Cl.
| | | |
|---|---|---|
| G06F 3/048 | (2013.01) | |
| G06F 17/30 | (2006.01) | |
| G06F 3/01 | (2006.01) | |
| G06F 3/0346 | (2013.01) | |
| G06F 3/0488 | (2013.01) | |

(52) U.S. Cl.
CPC .......... *G06F 17/30017* (2013.01); *G06F 3/017* (2013.01); *G06F 3/0346* (2013.01); *G06F 3/04886* (2013.01)

(58) Field of Classification Search
CPC ... G06F 3/0485; G06F 3/04842; G06F 3/017; G06F 3/04815; G06F 3/0483
USPC .......................................................... 715/776
See application file for complete search history.

(56) References Cited

U.S. PATENT DOCUMENTS 5,172,245 A * 12/1992 Kita et al. ...................... 715/776
5,694,523 A * 12/1997 Wical .............................. 706/45
(Continued)

FOREIGN PATENT DOCUMENTS

| CN | 101626427 A | 1/2010 |
|---|---|---|
| JP | 2-69870 A | 3/1990 |

(Continued)

OTHER PUBLICATIONS

Almeida et al., "Experiments Towards 3D Immersive Interaction for Digital Libraries", Proceedings of the First international conference on Technologies for E-Learning and Digital Entertainment (Edutainment '06), pp. 1348-1357, 2006.*

(Continued)

*Primary Examiner* — Jennifer To
*Assistant Examiner* — Joseph R Burwell
(74) *Attorney, Agent, or Firm* — Jefferson IP Law, LLP (57) ABSTRACT

A device and a method for searching for an electronic book (e-book) in a portable terminal are provided. More particularly, a device and a method for searching for an e-book in a portable terminal, which can conveniently manage and search for a plurality of e-books in a portable terminal, are provided. The device includes a display unit for displaying categories of e-books that each include one or more e-books, and a controller for controlling such that an e-book is searched for by displaying and scrolling through the categories of e-books according to a detected shift of the portable terminal, a corresponding category is enlarged according to a touch to the corresponding category, and at least one of the one or more e-books included in the enlarged category is displayed.

18 Claims, 11 Drawing Sheets

(56) References Cited

U.S. PATENT DOCUMENTS

| | | | |
|---|---|---|---|
| 5,768,580 A * | 6/1998 | Wical | 715/256 |
| 5,907,845 A * | 5/1999 | Cox et al. | 707/999.01 |
| 5,918,236 A * | 6/1999 | Wical | 715/209 |
| 5,930,788 A * | 7/1999 | Wical | 707/999.004 |
| 5,956,034 A * | 9/1999 | Sachs et al. | 715/776 |
| 6,061,675 A * | 5/2000 | Wical | 706/45 |
| 6,075,536 A * | 6/2000 | Kunieda et al. | 715/848 |
| 6,112,201 A * | 8/2000 | Wical | 707/999.003 |
| 6,199,034 B1 * | 3/2001 | Wical | 715/256 |
| 6,240,410 B1 * | 5/2001 | Wical | 715/776 |
| 6,331,865 B1 * | 12/2001 | Sachs et al. | 715/776 |
| 6,487,545 B1 * | 11/2002 | Wical | 706/45 |
| 6,757,673 B2 * | 6/2004 | Makus et al. | 707/999.003 |
| 6,765,553 B1 | 7/2004 | Odamura | |
| 6,938,069 B1 * | 8/2005 | Narayanaswamy | 709/205 |
| 7,139,977 B1 * | 11/2006 | Russell | 715/256 |
| 7,287,214 B1 * | 10/2007 | Jenkins et al. | 715/205 |
| 7,299,501 B2 * | 11/2007 | Hendricks | 726/27 |
| 7,778,994 B2 * | 8/2010 | Raman et al. | 707/706 |
| 8,060,489 B1 * | 11/2011 | Raman et al. | 707/706 |
| 8,201,099 B1 * | 6/2012 | Osbourn et al. | 715/778 |
| 8,209,358 B2 * | 6/2012 | Frieder et al. | 707/802 |
| 8,271,891 B1 * | 9/2012 | Osbourn et al. | 715/764 |
| 8,464,175 B2 * | 6/2013 | Turcan et al. | 715/776 |
| 8,725,573 B1 * | 5/2014 | Narang et al. | 705/15 |
| 9,170,713 B2 * | 10/2015 | Lee | G06F 3/0483 |
| 2001/0007980 A1 * | 7/2001 | Ishibashi et al. | 705/26 |
| 2002/0118230 A1 * | 8/2002 | Card et al. | 345/776 |
| 2003/0088582 A1 * | 5/2003 | Pflug | 707/104.1 |
| 2004/0140975 A1 | 7/2004 | Saito et al. | |
| 2006/0033762 A1 * | 2/2006 | Card et al. | 345/660 |
| 2007/0021930 A1 | 1/2007 | Uhlik | |
| 2007/0073719 A1 | 3/2007 | Ramer et al. | |
| 2008/0216009 A1 * | 9/2008 | Drallos | 715/776 |
| 2009/0012846 A1 * | 1/2009 | Ertell | G06Q 30/0601 705/27.2 |
| 2009/0128484 A1 | 5/2009 | Hanyu | |
| 2009/0235162 A1 * | 9/2009 | Nuccio et al. | 715/255 |
| 2009/0239202 A1 * | 9/2009 | Stone | 434/178 |
| 2010/0004031 A1 | 1/2010 | Kim | |
| 2010/0011315 A1 | 1/2010 | Araki | |
| 2010/0122170 A1 * | 5/2010 | Girsch et al. | 715/727 |
| 2010/0333025 A1 * | 12/2010 | Roberts | G06F 3/0482 715/823 |
| 2011/0072494 A1 | 3/2011 | Sato | |
| 2011/0167338 A1 * | 7/2011 | Pflug | 715/255 |
| 2011/0254911 A1 * | 10/2011 | Neuenschwander | 348/14.03 |
| 2011/0264694 A1 * | 10/2011 | Rensburg et al. | 707/770 |
| 2011/0314377 A1 * | 12/2011 | Goodman et al. | 715/716 |
| 2012/0110476 A1 * | 5/2012 | Qian | 715/757 |
| 2012/0311438 A1 * | 12/2012 | Cranfill et al. | 715/256 |
| 2013/0132884 A1 * | 5/2013 | Jang et al. | 715/775 |
| 2013/0159936 A1 * | 6/2013 | Yamaguchi | G06F 3/0485 715/850 |

FOREIGN PATENT DOCUMENTS

| | | | |
|---|---|---|---|
| JP | 6-4208 A | 1/1994 | |
| JP | 7-230477 A | 8/1995 | |
| JP | 11-65803 A | 3/1999 | |
| JP | 11-305918 A | 11/1999 | |
| JP | 2000-148345 A | 5/2000 | |
| JP | 2002-7027 A | 1/2002 | |
| JP | 2002-149662 A | 5/2002 | |
| JP | 2002-196881 A | 7/2002 | |
| JP | 2003-114752 A | 4/2003 | |
| JP | 2003-271664 A | 9/2003 | |
| JP | 2006-18381 A | 1/2006 | |
| JP | 2007-279848 A | 10/2007 | |
| JP | 2009-110178 A | 5/2009 | |
| JP | 2010-218527 A | 9/2010 | |
| KR | 10-2009-0074643 A | 7/2009 | |
| KR | 10-2011-0071686 A | 6/2011 | |
| WO | 02/084550 A1 | 10/2002 | |

OTHER PUBLICATIONS

Cubaud et al., "3D Metaphors to Access a Digitalized Library", Virtual Reality International Conference (VRIC), Jun. 2002.*

Cubaud et al., "Binding Browsing and Reading Activities in a 3D Digital Library", Proceedings of the Second ACM/IEEE-CS Joint Conference on Digital Libraries, 2002.*

Dupire et al., "Using Game Engines for Non 3D Gaming Applications", International Conference on Computer Games (CGAMES '05), 2005.*

Barlett, "Rock 'n' Scroll is Here to Stay", WRL Research Report 2000/3, Compaq Western Research Library, 2000.*

Brewer, "On-Screen Bookshelf for PC Office Systems", Technical Disclosure Bulletin, v. 11-89, pp. 266-267, Nov. 1989 (IPCOM000036936D).*

Christoffel et al., "Accessing Libraries as Easy as a Game", Proceedings of the 2nd International Workshop on Visual Interfaces for Digital Libraries, pp. 25-36, 2002.*

Kikuchi et al., "User Interface for a Digital Library to Support Construction of a 'Virtual Personal Library'", Proceedings of the Third IEEE International Conference on Multimedia Computing and Systems, pp. 429-432, Jun. 1996.*

Leyba et al., "Three-Dimensional Scrolling Bookshelf Displays Contents of Computer", Technical Disclosure Bulletin, v. 40, n. 5, pp. 95-96, May 1997 (IPCOM000118687D).*

Liu et al., "BrowsReader: A System for Realizing a New Children's Reading Environment in a Library", Proceedings of the 10th International Conference on Asian Digital Libraries: Looking Back 10 Years and Forging New Frontiers (ICADL '07), pp. 361-371, 2007.*

Oakley et al., "Tilt to Scroll: Evaluating a Motion Based Vibrotactile Mobile Interface", Proceedings of the First Joint Eurohaptics Conference and Symposium on Haptic Interfaces for Virtual Environment and Teleoperator Systems, 2005.*

Paul, "Hands-on: Reading e-books on Android with Aldiko", http://arstechnica.com/information-technology/2010/09/hands-on-reading-e-books-on-android-with-aldiko/, Sep. 23, 2010.*

Tani et al., "User interfaces for information strolling on a digital library", Proceedings of the International Symposium on Digital Libraries (ISDL '95), pp. 167-174, 1995.*

Hakozaki et al., "Conceptual Design of a Virtual Library for Personal Use", Systems and Computers in Japan, v. 30, n. 3, pp. 43-51, 1999.*

* cited by examiner

DEVICE AND METHOD FOR SEARCHING FOR AN E-BOOK VIA E-BOOK CATEGORIES IN A VIRTUAL BOOKSHELF IN A PORTABLE TERMINAL

PRIORITY

This application claims the benefit under 35 U.S.C. §119(a) of a Korean patent application filed in the Korean Industrial Property Office on Nov. 26, 2010 and assigned Serial No. 10-2010-0118581, the entire disclosure of which is hereby incorporated by reference.

BACKGROUND OF THE INVENTION

1. Field of the Invention

The present invention relates to a device and a method for searching for an electronic book (e-book) in a portable terminal. More particularly, the present invention relates to a device and a method for searching for an e-book in a portable terminal, which can conveniently manage and search for a plurality of e-books in a portable terminal.

2. Description of the Related Art

Due to developments in internet technology and digital technology, books are now being published in a digital form. Books that are published in a digital form are referred to as an electronic book (e-book).

The e-book has a number of advantages. For example, the e-book does not consume publishing costs and publishing materials, such as a paper and an ink, there is no concern whether the e-book is in stock, and the price of the e-book is low due to there not being distribution costs. Accordingly, it is expected that the e-book will be widely used in the digital era. While the present market share of the e-book is considerably small, the number of published e-books has been increasing day by day. Thus, it is anticipated that the e-book will represent a considerable share in the future book market.

In addition to the advantages of the e-book as discussed above, the e-book has a characteristic in that when a revised edition is published, it is possible to separately print and publish the revised part, thereby addressing the inconvenience of having to buy a new paper book when a revised edition of an existing paper book is published. In addition, it is possible to provide a reader with a large amount of information with lower prices.

In order to use the e-book, the reader installs an e-book program in a computer and executes the e-book program whenever he/she desires to read the e-book. The e-book program can be installed in a Handheld Personal Computer (HPC), a palm Personal Computer (PC), and a portable device, such as a Personal Digital Assistant (PDA) and a portable terminal, as well as in a desktop computer and a notebook computer.

When the reader desires to read the e-book stored in a portable terminal in which the e-book program is installed, the reader generally searches for the corresponding e-book through a scrolling action.

Figure 1A:
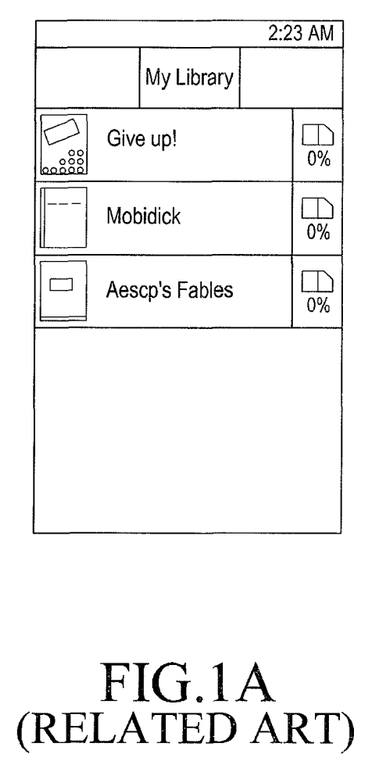
FIGS. 1A and 1B are views illustrating an action for searching for an e-book in a portable terminal, according to the related art.
Figure 1B:
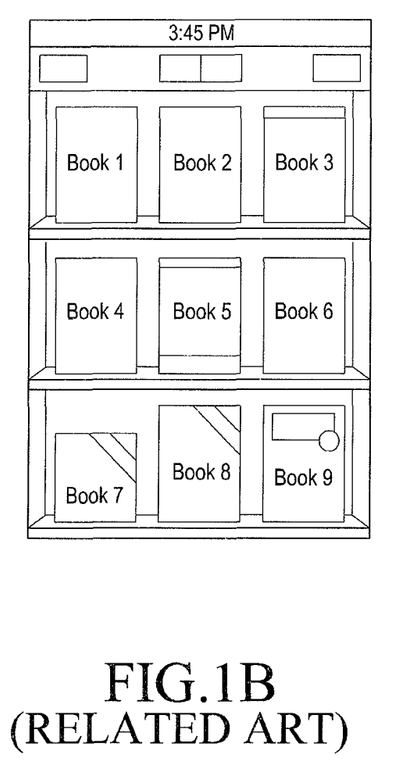

FIGS. 1A and 1B are views illustrating an action for searching for an e-book in a portable terminal, according to the related art.

Referring to FIGS. 1A and 1B, the portable terminal displays e-books stored in the portable terminal without the specific categorization and the reader searches for the desired e-book through the scrolling action.

However, when the portable terminal stores a large number of e-books, the reader has to inconveniently perform the scrolling action numerous times in order to search for the desired e-book.

SUMMARY OF THE INVENTION

Aspects of the present invention are to address the above-mentioned problems and/or disadvantages and to provide at least the advantages described below. Accordingly, an aspect of the present invention is to provide a device and a method for searching for an electronic book (e-book) in a portable terminal, which can conveniently manage and search for a plurality of e-books in a portable terminal.

Another aspect of the present invention is to provide a device and a method for searching for an e-book in a portable terminal, which can provide a user of a portable terminal with an analog-like feeling.

In accordance with an aspect of the present invention, a device for searching for an e-book in a portable terminal is provided. The device includes a display unit for displaying categories of e-books that each include one or more e-books, and a controller for controlling such that an e-book is searched for by displaying and scrolling through the categories of e-books according to a detected shift of the portable terminal, a corresponding category is enlarged according to a touch to the corresponding category, and at least one of the one or more e-books included in the enlarged category is displayed.

In accordance with another aspect of the present invention, a method for searching for an e-book in a portable terminal is provided. The method includes displaying categories of e-books that each include one or more e-books, when the portable terminal is shifted, searching for an e-book by displaying and scrolling through the categories of e-books according to the shift of the portable terminal, and when a touch to a corresponding category is detected, enlarging the touched category and displaying at least one of the one or more e-books included in the enlarged category.

Accordingly, aspects of the present invention provide the device and the method for searching for the e-book in the portable terminal, so that it is possible to conveniently store and search for the e-book in the portable terminal and provide the user with an analog-like feeling.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
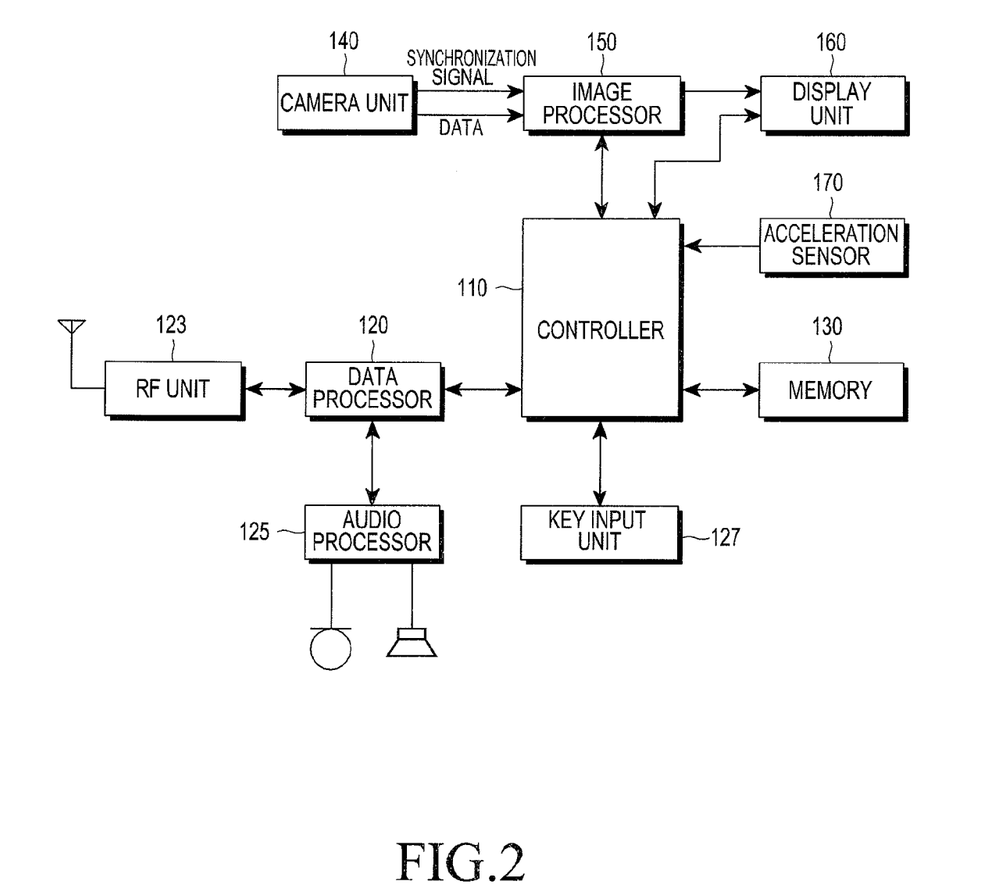
FIG. 2 is a block diagram illustrating a construction of a portable terminal, according to an exemplary embodiment of the present invention.

FIG. 2 is a block diagram illustrating a construction of a portable terminal, according to an exemplary embodiment of the present invention.

Referring to FIG. 2, a Radio Frequency (RF) unit 123 performs a wireless communication function of the portable terminal. The RF unit 123 includes an RF transmitter for up-converting and amplifying a frequency of a transmitted signal and an RF receiver for low-noise amplifying a received signal and down-converting a frequency. A data processor 120 includes a transmitter for encoding and modulating the transmitted signal and a receiver for demodulating and decoding the received signal. That is, the data processor 120 is formed with a modem and a codec. Here, the codec includes a data codec processing packet data, etc. and an audio codec processing an audio signal, such as a voice, etc. An audio processor 125 reproduces, through a speaker, a received audio signal output from the audio codec of the data processor 120 or transmits a transmitted audio signal generated by a microphone to the audio codec of the data processor 120.

A key input unit 127 includes keys for inputting numbers and character information and functional keys for setting various types of functions.

A memory 130 can be formed with a program memory and a data memory. The program memory can store programs for controlling general operations of the portable terminal and programs for controlling such that electronic books (e-books) stored in the portable terminal are classified and displayed based on category through a virtual bookshelf.

A controller 110 performs a function of controlling general operations of the portable terminal.

The controller 110 controls such that the e-books that are classified based on category are displayed through the virtual bookshelf and the categories are classified and displayed according to book boxes of the virtual bookshelf, according to an exemplary embodiment of the present invention.

Further, the controller 110 controls such that when the e-books are displayed based on category on the virtual bookshelf, the e-books included in each category are displayed together with a title of the corresponding category at a position of the corresponding category, according to an exemplary embodiment of the present invention.

Further, the controller 110 controls such that sizes of the categories based on which the e-books are classified and displayed on the virtual bookshelf are all the same, or are variable according to the number of e-books included in each of the categories, according to an exemplary embodiment of the present invention. Herein, in one exemplary embodiment, each category of the e-books may not include a visual representation corresponding to the number of e-books included in the corresponding category. In another exemplary embodiment, each category of the e-books may include a visual representation for each e-book included in the corresponding category. In yet another exemplary embodiment, each category of the e-books may include a visual representation that is indicative of the number of e-books included in the corresponding category. In still another exemplary embodiment, the visual representation of the number of e-books included in a corresponding category may be indicative of the number of e-books included in the corresponding category relative to other categories.

Further, the controller 110 controls such that a user sets a corresponding category at a corresponding position and modifies or deletes the position and a title of the set corresponding category, according to an exemplary embodiment of the present invention.

Further, the controller 110 controls such that an e-book is searched for by scrolling through the categories of the e-books on the virtual bookshelf that are displayed on the display unit of the portable terminal according to a shift of the portable terminal. The shift of the portable terminal may include at least one of an inclination, a movement, and a rotation of the portable terminal, according to an exemplary embodiment of the present invention.

Further, the controller 110 controls such that an e-book is searched for by displaying and scrolling through categories of the e-books on the virtual bookshelf, which are not displayed on the display unit of the portable terminal when an inclination of the portable terminal is detected, according to a direction and a speed of the up, down, left, or right inclination detected in the portable terminal, according to an exemplary embodiment of the present invention.

Further, the controller 110 controls such that an e-book is searched for by displaying and scrolling through categories of the e-books on the virtual bookshelf, which are not displayed on the display unit of the portable terminal when a movement of the portable terminal is detected, according to a direction and a speed of the up, down, left, or right movement detected in the portable terminal. Here, the displaying and scrolling through categories of the e-books may be faster when the displaying and scrolling is based on the movement of the portable terminal as compared to when the displaying and scrolling is based on the inclination of the portable terminal, according to an exemplary embodiment of the present invention.

Further, the controller 110 controls such that when a rotation of the portable terminal is detected, another virtual bookshelf, which is not displayed on the display unit of the portable terminal when the rotation of the portable terminal is detected, is displayed according to a direction of the left, right or up, or down rotation, according to an exemplary embodiment of the present invention.

Further, the controller 110 controls such that during the display of the categories of e-books on the virtual bookshelf, when a single-touch is detected to a category or a title of the category, a list of e-books included in the corresponding category is displayed as a pop-up window, and contents of an e-book selected by a single touch from the list of the e-books are displayed through an execution of an e-book viewer, according to an exemplary embodiment of the present invention.

Further, the controller 110 controls such that when multi-touches to an identical category are detected during the display of the categories of the e-books on the virtual bookshelf, the corresponding category is enlarged, one or more of e-books included in the enlarged category are displayed, and the contents of an e-book selected from the e-books included in the enlarged category through a single touch are displayed through an execution of the e-book viewer, according to an exemplary embodiment of the present invention.

Further, the controller 110 controls such that when multi-touches to two categories are detected during the display of the categories of the e-books on the virtual bookshelf, the category including the larger number of e-books is enlarged, one or more of e-books included in the enlarged category are displayed, and the contents of an e-book selected from one or more e-books by a single touch are displayed through an execution of the e-book viewer, according to an exemplary embodiment of the present invention.

Further, the controller 110 controls such that when the shift of the portable terminal is detected during the display of enlarged categories of the e-books, e-books that are not displayed on the display unit of the portable terminal are displayed enlarged and scrolled through according to a direction of the shift of the portable terminal, according to an exemplary embodiment of the present invention.

In this regard, the shift of the portable terminal includes at least one of the inclination and the movement, and the scrolling action of the e-books according to the inclination or the movement of the portable terminal is substantially identical to the scrolling of the e-books according to the shift of the portable terminal in the virtual bookshelf, according to an exemplary embodiment of the present invention.

An acceleration sensor 170 detects the shift, i.e. one or more of the inclination, the movement, and the rotation, of the portable terminal during the display of a virtual bookshelf, and transmits a detected signal to the controller 110, according to an exemplary embodiment of the present invention.

Further, the acceleration sensor 170 detects the shift, i.e. one or more of the inclination, the movement, and the rotation, of the portable terminal during the enlargement and display of the corresponding category and transmits a detected signal to the controller 110, according to an exemplary embodiment of the present invention.

A camera unit 140 photographs image data, and includes a camera sensor converting a photographed optical signal into an electrical signal, and a signal processor converting an analog image signal photographed by the camera sensor into digital data. The camera unit 140 may output the digital data and a synchronization signal to the image processor 150. Here, it is assumed that the camera sensor is one of a Charge-Coupled Device (CCD) sensor and a Complementary Metal-Oxide-Semiconductor (CMOS) sensor, and the signal processor can be implemented with a Digital Signal Processor (DSP). Further, the camera sensor and the signal processor can be integrally implemented with each other or separately implemented from each other.

An image processor 150 performs an Image Signal Processing (ISP) for displaying an image signal output from the camera unit 140 on the display unit 160, and the ISP performs a function, such as one or more of a gamma correction, interpolation, spatial change, image effect, image scale, Auto White Balance (AWB), Auto Exposure (AE), and Auto Focus (AF). The image processor 150 processes the image signal output from the camera unit 140 frame by frame and adjusts and outputs the frame-unit image data in accordance with a characteristic and a size of the display unit 160. Further, the image processor 150 includes an audio codec, and performs a function of compressing frame image data displayed on the display unit 160 in accordance with a set scheme or restoring the compressed frame image data to original frame image data. Here, the image codec includes a Joint Photographic Experts Group (JPEG) codec, a Moving Picture Experts Group (MPEG)-4 codec, a Wavelet codec, etc. The image processor 150 is assumed to have the On Screen Display (OSD) function and can output OSD data according to a size of a screen displayed under the control of the controller 110.

The display unit 160 displays an image signal output from the image processor 150 on a screen and user data output from the controller 110. Here, the display unit 160 can be implemented with a Liquid Crystal Display (LCD), an Active Matrix Organic Light Emitting Diode (AMOLED), etc., and the display unit 160, in this case, can include a display controller, a memory capable of storing image data, a display device, etc. Here, when one of the LCD, AMOLED, etc. is implemented in a touch screen scheme, the one of the LCD, AMOLED, etc. that is implemented can function as an input unit, and in this regard, one or more of the keys of the input unit 127 can be displayed on the display unit 160.

Further, the display unit 160 displays the e-books classified based on category on the virtual bookshelf, according to an exemplary embodiment of the present invention.

An operation of searching for an e-book in the portable terminal as described above will be described below with reference to FIGS. 3A to 9 in additional detail.

Figure 3A:
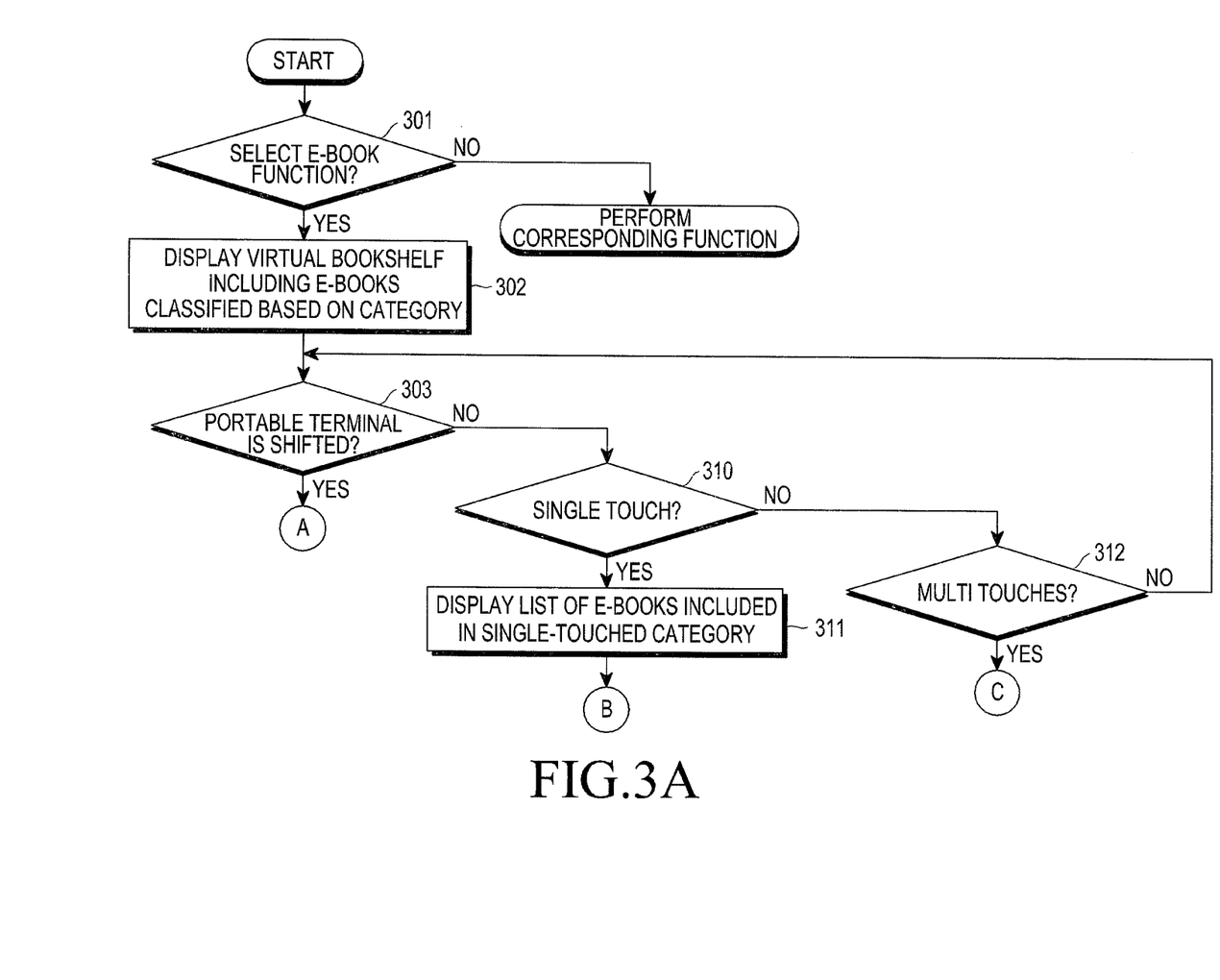
FIGS. 3A to 3C are a flowchart illustrating a process of searching for an e-book in a portable terminal, according to an exemplary embodiment of the present invention.
Figure 3B:
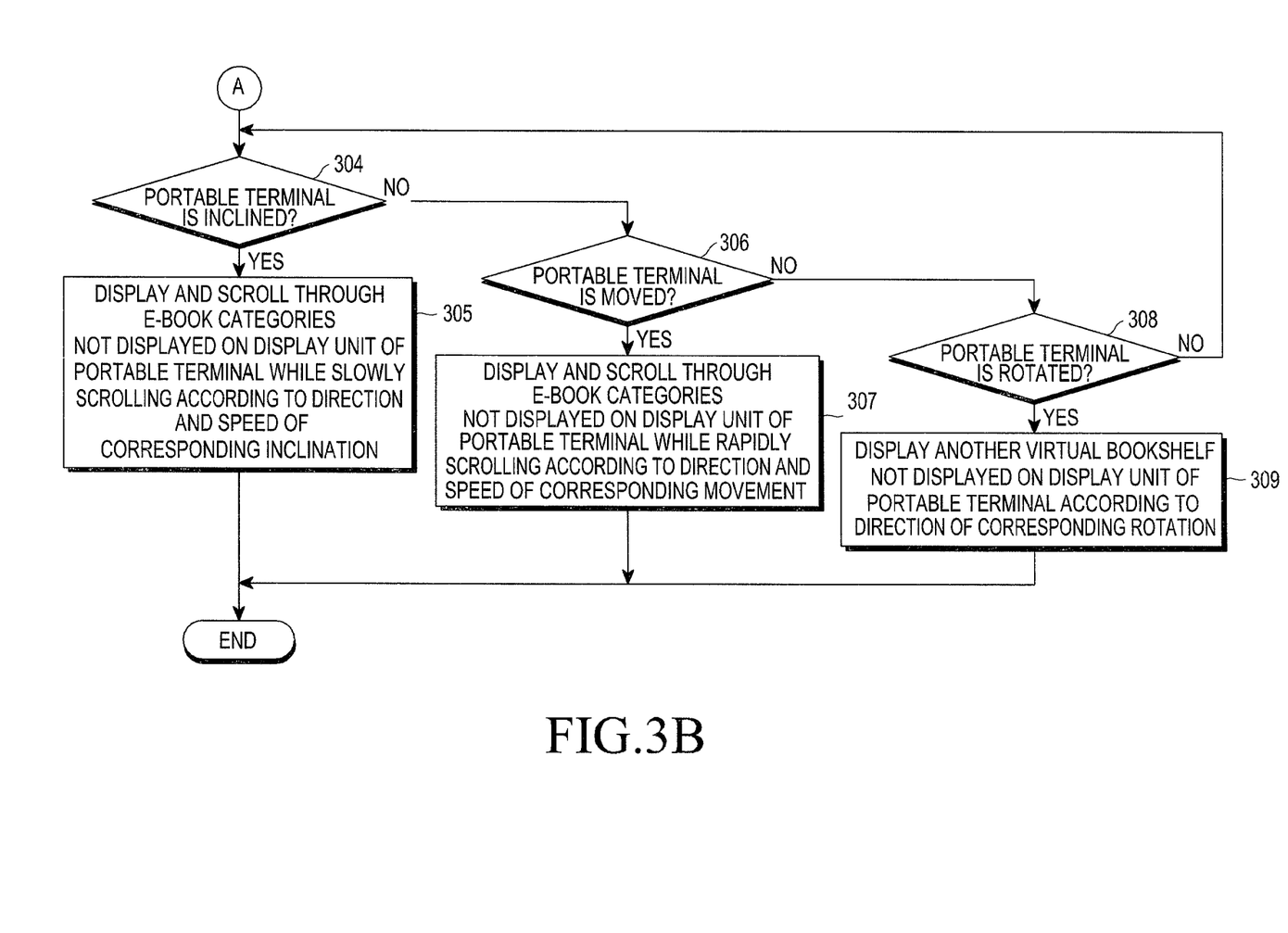
Figure 3C:
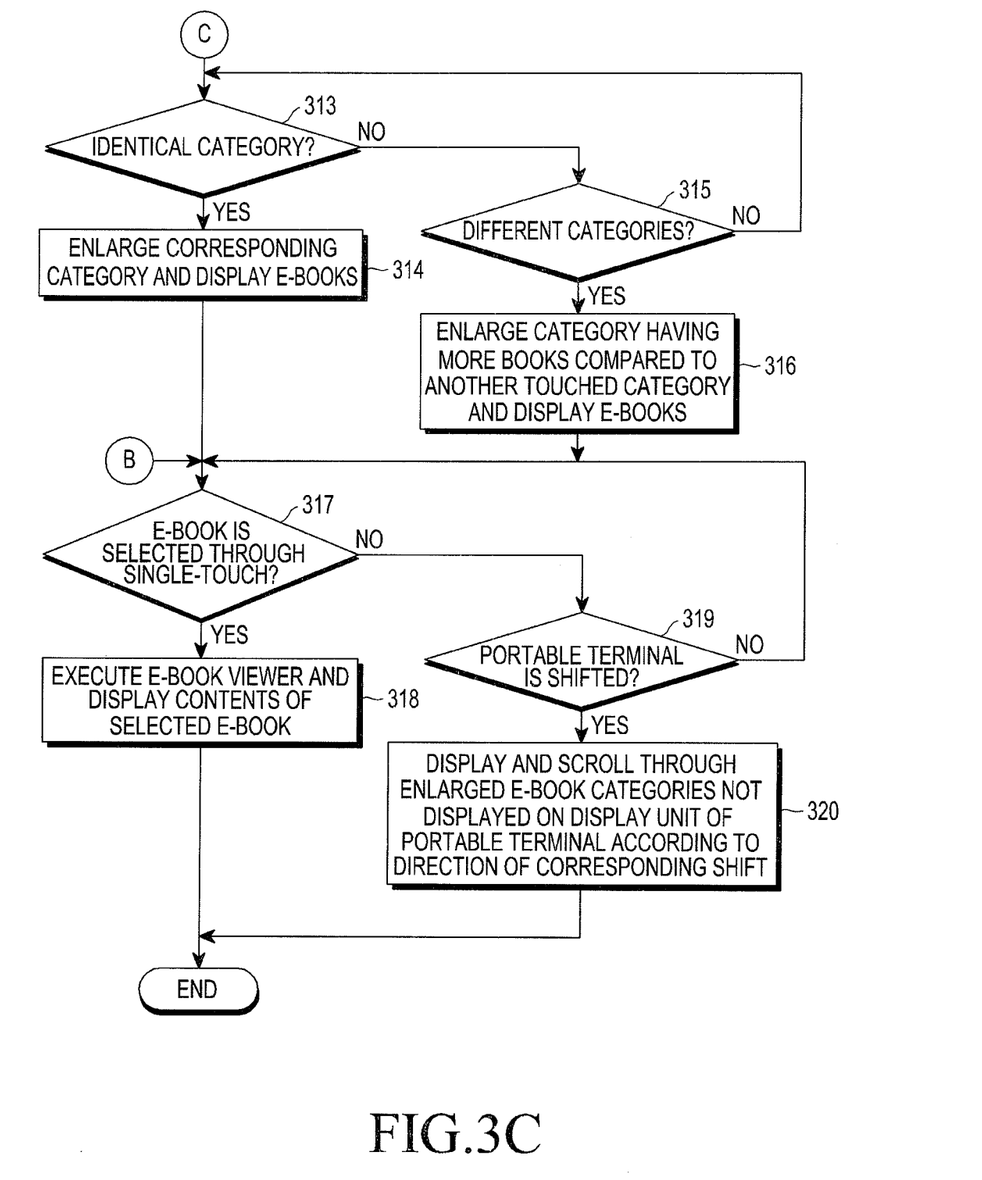
Figure 4A:
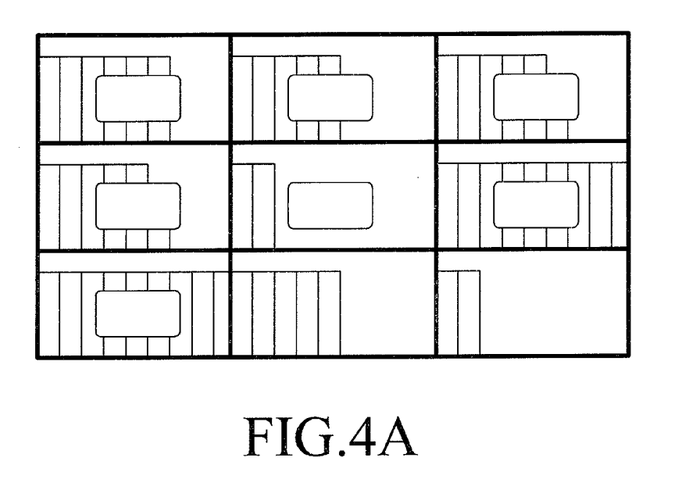
FIGS. 4A and 4B are views illustrating a type of virtual bookshelf of FIGS. 3A to 3C, according to an exemplary embodiment of the present invention.
Figure 4B:
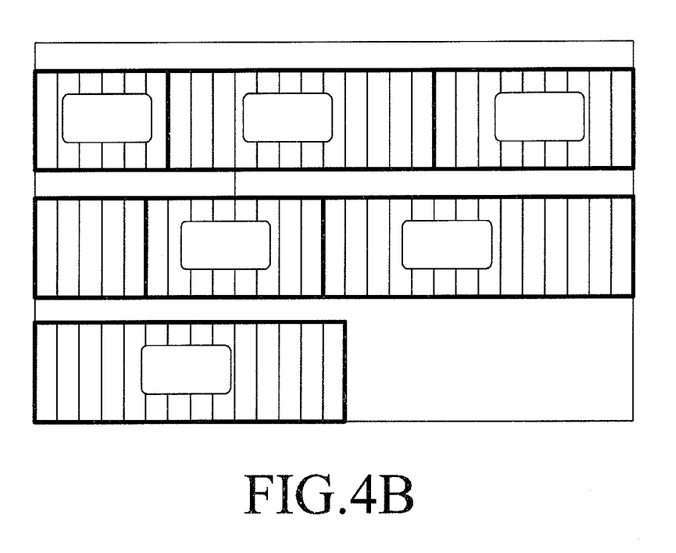
Figure 5:
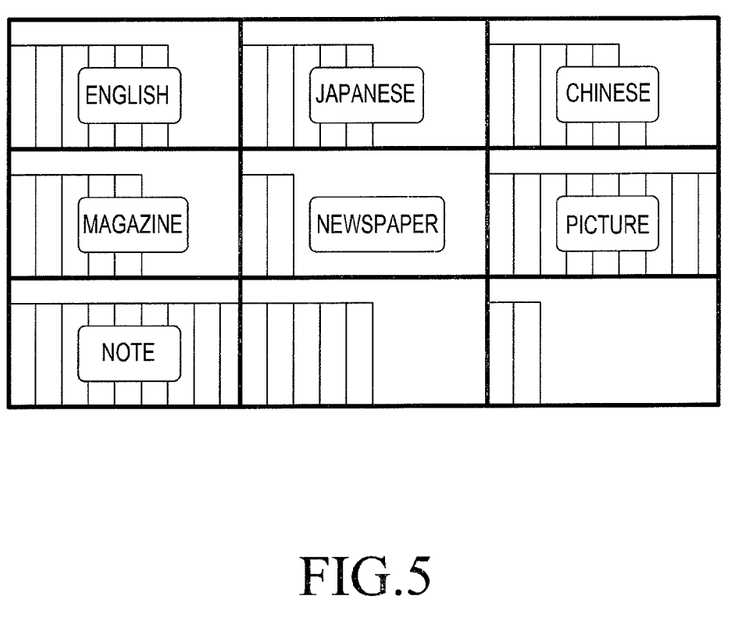
FIG. 5 is a view illustrating a virtual bookshelf classified based on category of FIGS. 3A to 3C, according to an exemplary embodiment of the present invention.
Figure 6A:
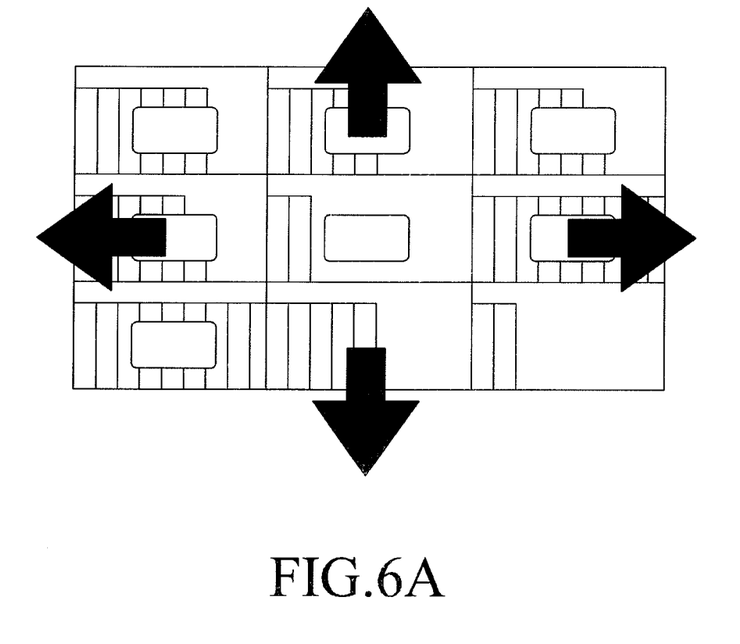
FIGS. 6A and 6B are views illustrating scrolling through categories of e-books according to a shift of a portable terminal in FIGS. 3A to 3C, according to an exemplary embodiment of the present invention.
Figure 6B:
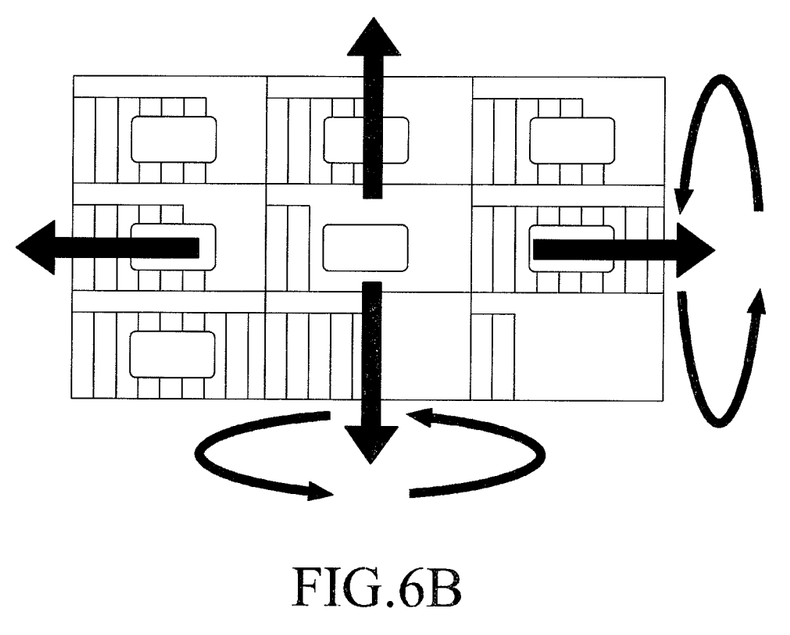
Figure 7:
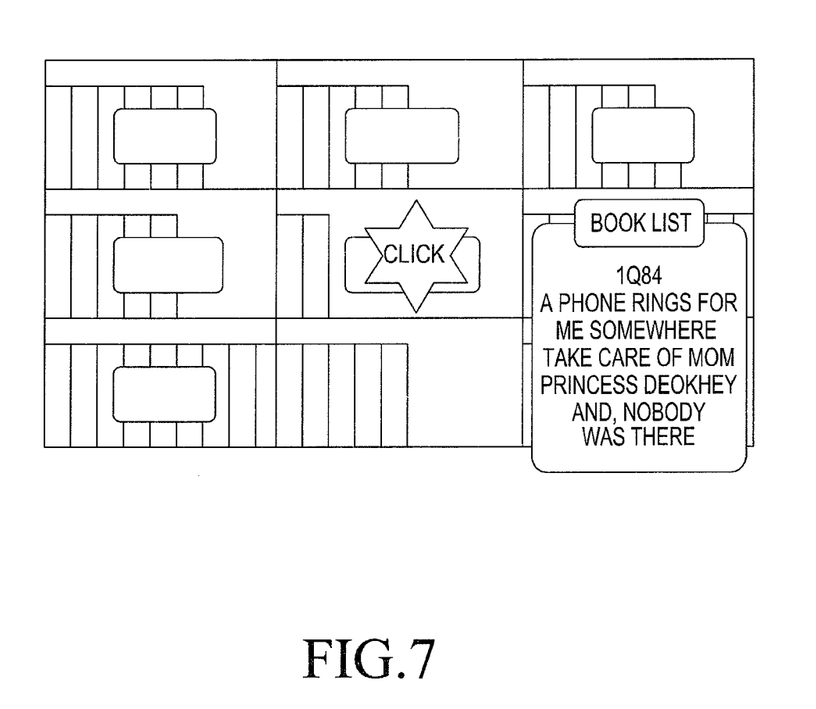
FIG. 7 is a view illustrating an operation according to a single touch to a corresponding category in FIGS. 3A to 3C, according to an exemplary embodiment of the present invention.
Figure 8A:
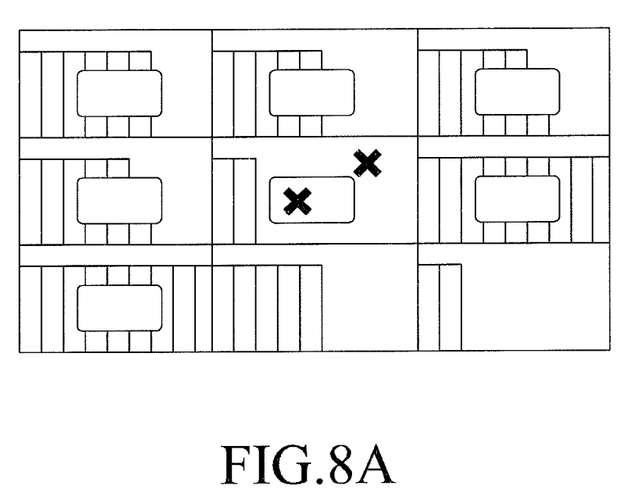
FIGS. 8A and 8B are views illustrating an operation according to multi-touches to at least one corresponding category in FIGS. 3A to 3C, according to an exemplary embodiment of the present invention.
Figure 8B:
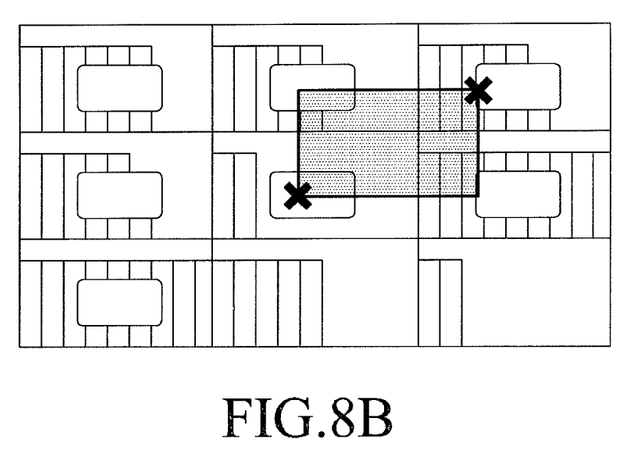
Figure 9:
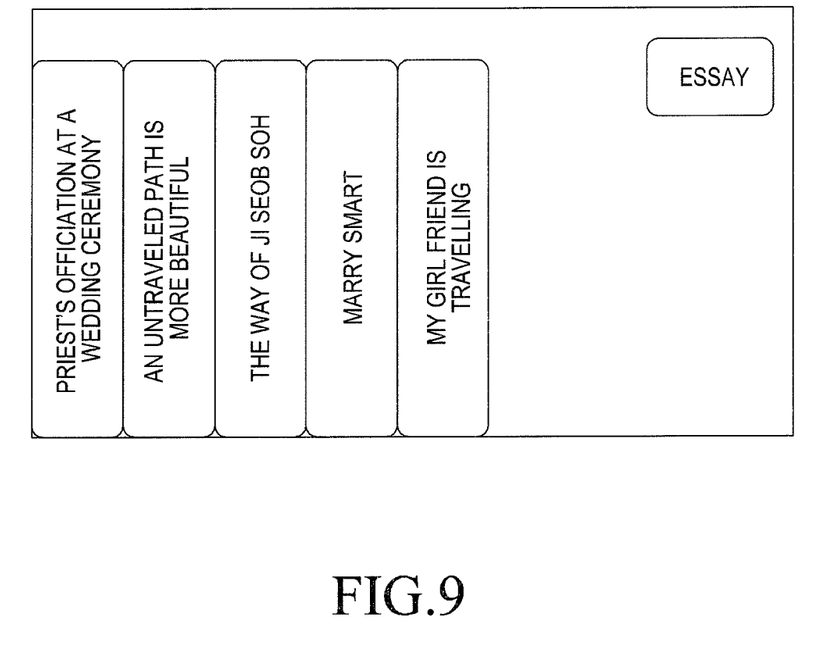
FIG. 9 is a view illustrating an enlargement of a selected corresponding category in FIGS. 3A to 3C, according to an exemplary embodiment of the present invention.

FIGS. 3A to 3C are a flowchart illustrating a process of searching for an e-book in a portable terminal, according to an exemplary embodiment of the present invention. FIGS. 4A and 4B are views illustrating a type of virtual bookshelf of FIGS. 3A to 3C, according to an exemplary embodiment of the present invention. FIG. 5 is a view illustrating a virtual bookshelf classified based on category in FIGS. 3A to 3C, according to an exemplary embodiment of the present invention. FIGS. 6A and 6B are views illustrating scrolling through categories of e-books according to a shift of a portable terminal according to FIGS. 3A to 3C, according to an exemplary embodiment of the present invention. FIG. 7 is a view illustrating an operation according to a single touch to a corresponding category in FIGS. 3A to 3C, according to an exemplary embodiment of the present invention. FIGS. 8A and 8B are views illustrating an operation according to multi-touches to at least one corresponding category in FIGS. 3A to 3C, according to an exemplary embodiment of the present invention. FIG. 9 is a view illustrating an enlargement of a selected corresponding category in FIGS. 3A to 3C, according to an exemplary embodiment of the present invention.

Referring to FIGS. 3A to 3C, when an e-book function is not selected, the portable terminal performs a corresponding function. In contrast, when an e-book function is selected in the portable terminal, the controller 110 detects the selection in step 301 and displays a virtual bookshelf on which the e-books are classified based on category in step 302.

Categories on the virtual bookshelf may be discriminated according to respective book boxes on the virtual bookshelf. Each category can be set at a corresponding location, i.e. a corresponding book box, by the user. The position and a title of each set corresponding category can be at least one of added, modified, and deleted by the user.

Further, when the user of the portable terminal purchases a new e-book, the user can manually designate the new e-book at a position of a corresponding category or the new e-book can be automatically designated for a corresponding category based on information of the new e-book and displayed at a position of the corresponding category.

Further, the category can be designated for each book box by the user one by one or classified based on one or more of a sequence of publication time, a sequence of character order, a sequence of purchase time, or a theme by the user.

The virtual bookshelf displayed in step 302 can be displayed as a fixed type or an array type of virtual bookshelf. Referring to FIG. 4A, the fixed type virtual bookshelf is illustrated, in which same-sized categories are displayed regardless of the number of e-books. Therefore, when the number of e-books is larger than a maximum number of e-books that can be displayed in a single category, the remainder may be displayed in a next category.

Referring to FIG. 4B, an array type virtual bookshelf is illustrated, in which the sizes of categories for displaying the e-books can be flexibly changed according to the number of stored books.

In step 302, a size of the virtual bookshelf is displayed identically to a screen size of the display unit 160, the sizes of the e-books can be identically displayed, and a title can be displayed for each of the e-books. Alternatively, the size of the virtual bookshelf may be larger or smaller than the screen size of the display unit 160.

Further, in step 302, when the e-books classified based on category are displayed on the virtual bookshelf, a title of a corresponding category can be displayed so as to be visually associated with the corresponding category. For example, the title of a corresponding category may be displayed in the corresponding category, centered about the corresponding category, or mostly located in the corresponding category. Referring to FIG. 5, each of the titles is displayed on the virtual bookshelf within the categories based on which the e-books are classified.

When the portable terminal shifts during the display of the e-books classified based on category on the virtual bookshelf in step 302, the controller 110 detects the shift of the portable terminal and determines a type of shift of the portable terminal in step 303.

Referring to FIG. 3B, when the shift of the portable terminal corresponds to an inclination, the acceleration sensor 170 detects the inclination of the portable terminal and transmits a detection signal for a direction and a speed of the inclination of the portable terminal to the controller 110 in step 304.

Based on the detection signal received from the acceleration sensor 170, the controller 110 performs step 305, in which the controller 110 displays and scrolls through categories of e-books, which are not displayed on the display unit 160 when the detection signal is received from the acceleration sensor 170, while slowly scrolling in accordance with the direction and the speed of the corresponding up, down, left, or right inclination.

Referring to FIG. 6A, an operation of scrolling through categories of e-books according to the detected inclination of the portable terminal is illustrated.

Further, when the shift of the portable terminal corresponds to a movement, the acceleration sensor 170 detects the movement and transmits a detection signal for a direction and a speed of the movement of the portable terminal to the controller 110 in step 306.

Based on the detection signal received from the acceleration sensor 170, the controller 110 performs step 307, in which the controller 110 displays and scrolls through categories of e-books, which is not displayed on the display unit 160 when the detection signal is received from the acceleration sensor 170, while rapidly scrolling according to the direction and the speed of the corresponding up, down, left, or right movement of the portable terminal. Here, the displaying and scrolling through categories based on the movement of the portable terminal is faster than the displaying and scrolling through categories based on the inclination of the portable terminal.

Further, when the shift of the portable terminal corresponds to a rotation, the acceleration sensor 170 detects the rotation and transmits a detection signal for a direction and speed of the rotation of the portable terminal to the controller 110 in step 308.

Based on the detection signal received from the acceleration sensor 170, the controller 110 performs step 309, in which the controller 110 displays e-books classified based on category on another virtual bookshelf positioned on an opposite side, which is not displayed on the display unit 160 when the detection signal is received from the acceleration sensor 170, according to a direction of the corresponding left, right, up or down rotation.

Referring to FIG. 6B, the operation of scrolling through categories of e-books according to the movement and the rotation direction of the portable terminal is illustrated.

Again, during the display of the virtual bookshelf in step 302, when the corresponding category or a title of the corresponding category is single-touched, the controller 110 detects the single touch in step 310, and displays a list of the e-books included in the single-touched category in a form of a pop-up window in step 311.

Referring to FIG. 7, an operation of the enlargement and the display of the list included in the single-touched category in a form of a pop-up window according to the detection of the single touch to the title of the corresponding category is illustrated.

When an e-book is selected from the list of the e-books through a single touch during the display of the list of the e-books in step 311, the controller 110 detects the single touch in step 317 of FIG. 3C and displays contents of the selected e-book through an execution of an e-book viewer in step 318.

Otherwise, when multi-touches are detected during the display of the virtual bookshelf in step 302, the controller detects the multi-touches in step 312 and determines the number of multi-touched categories in step 312.

When the multi-touches are all detected in the same category as shown in FIG. 8A, the controller 110 detects the multi-touches in step 313 of FIG. 3C, enlarges the corresponding category to a same or different size as the screen size, and displays one or more e-books included in the corresponding category in step 314.

However, when the multi-touches are detected in two or more different categories as shown in FIG. 8B, the controller 110 detects the multi-touches in step 315, enlarges a category including the largest number of e-books among the multi-touched categories to a same or different size as the screen size of the display unit 160, and displays one or more e-books included in the corresponding category in step 316.

In one exemplary implementation, when the multi-touches are detected in two different categories as shown in FIG. 8B, four categories are selected. Therefore, the controller 110 enlarges and displays a category including the largest number of e-books compared to the three other touched categories to a same or different size as the screen size of the display unit 160. Further, in one exemplary implementation, when four or more categories are selected through the multi-touches, the controller 110 nullifies the multi-touches and makes the user reselect the category.

Referring to FIG. 9, an operation of the enlargement and the display of the category selected through the multi-touches is illustrated.

When an e-book is selected through the single touch during the enlargement of the corresponding category and the display of the e-books included in the corresponding category in step 314 or step 316, the controller 110 detects the selection of the e-book in step 317, and displays contents of the selected e-book through the execution of the e-book viewer in step 318.

Otherwise, when the portable terminal shifts during the enlargement of the corresponding category and the display of the e-books included in the corresponding category in step 314 or step 316, the acceleration sensor 170 detects the shift of the portable terminal in step 319 and transmits a detection signal for a direction and a speed of the shift of the portable terminal to the controller 110. Then, the controller 110 performs step 320, in which the controller 110 displays and scrolls through enlarged categories of e-books, which are not displayed on the display unit 160 when the shift of the portable terminal is detected, according to the direction and the speed of the corresponding shift, so that the e-books included in the different categories are displayed.

The shift of the portable terminal in steps 319 and 320 includes the inclination and the movement of the portable terminal, and the operations of scrolling through the different categories according to the inclination and the movement of the portable terminal are the substantially the same as steps 304 to 307 of FIG. 3B.

In the exemplary embodiments of the present invention, it is exemplified that the e-books are classified and displayed based on category through the virtual bookshelf, but all virtual articles, in addition to the virtual bookshelf, capable of displaying e-books classified based on category can be adopted to the present invention.

While the invention has been shown and described with reference to certain exemplary embodiments and drawings thereof, it will be understood by those skilled in the art that various changes in form and details may be made therein without departing from the spirit and scope of the invention as defined by the appended claims and their equivalents.

What is claimed is:

1. A device for searching for an electronic book (e-book) in a portable terminal, the device comprising:
    a display unit configured to display categories of e-books that each include one or more e-books; and
    a controller configured to:
        search for a category by displaying and scrolling through the categories of e-books in any direction according to a detected kind of shift of the portable terminal,
        detect a corresponding category of the categories of e-books according to a touch by a user,
        display at least one of the one or more e-books included in the detected category, and
        scroll e-books corresponding to the detected category in any direction according to a detected kind of shift of the portable terminal after displaying at least one of the one or more e-books included in the detected category,
    wherein the detected kind of shift of the portable terminal includes at least one of an inclination, an up, down, left or right movement, and a rotation of the portable terminal,
    wherein, when two or more categories are selected through a multi-touch, a category having a largest number of e-books among the categories selected through the multi-touch is enlarged and each e-book included in the enlarged category is displayed, and
    wherein contents of an e-book selected by a single touch from the e-books included in the enlarged category are displayed through an execution of the e-book viewer.

2. The device as claimed in claim 1,
    wherein the categories of e-books are displayed on a virtual bookshelf, and
    wherein each category is separately displayed using a book box on the virtual bookshelf.

3. The device as claimed in claim 1,
    wherein the user sets a corresponding category at a corresponding position, and
    wherein the position and a title of the set corresponding category is modified or deleted by the user.

4. The device as claimed in claim 1, wherein a title of a corresponding category being displayed at a position of the corresponding category.

5. The device as claimed in claim 1, wherein a size of each category is the same or is varied according to a number of the one or more e-books included in the respective category.

6. The device as claimed in claim 1,
    wherein, when an inclination or a movement of the portable terminal is detected, categories of e-books, which are not displayed on the display unit when the inclination or movement is detected, are displayed and scrolled through according to a direction and a speed of the corresponding detected inclination or movement of the portable terminal, and
    wherein the speed at which the e-books are displayed according to the detected movement of the portable terminal is greater than the speed at which the e-books are displayed according to the detected inclination of the portable terminal.

7. The device as claimed in claim 1, wherein, when a rotation of the portable terminal is detected, different categories of e-books, which are not displayed on the display unit of the portable terminal when the rotation is detected, are displayed according to a direction of the detected rotation of the portable terminal.

8. The device as claimed in claim 1,
wherein a list of e-books included in a single-touched corresponding category or a title of the corresponding category is displayed, and
wherein contents of an e-book selected from the list of e-books by a single touch are displayed through an execution of an e-book viewer.

9. The device as claimed in claim 1,
wherein, when one category is selected through a multi-touch, the selected category is enlarged and at least one of the one or more e-books included in the enlarged category is displayed, and
wherein contents of an e-book selected from among the e-books included in the enlarged category by a single touch are displayed through an execution of an e-book viewer.

10. The device as claimed in claim 9, wherein, when a shift of the portable terminal is detected during the display of at least one of the one or more e-books included in the detected category, different categories of e-books, which are not displayed on the display unit of the portable terminal prior to the shift of the portable terminal being detected, are displayed and scrolled through according to a direction of the detected shift of the portable terminal.

11. A method for searching for an electronic book (e-book) in a portable terminal, the method comprising:
displaying categories of e-books that each includes one or more e-books;
searching, when the portable terminal is shifted, for a category by displaying and scrolling through the categories of e-books in any direction according to a detected kind of shift of the portable terminal;
displaying, when a corresponding category of the categories of e-books according to a touch by a user is detected, at least one of the one or more e-books included in the detected category;
scrolling e-books corresponding to the detected category in any direction according to the detected kind of shift of the portable terminal after displaying at least one of the one or more e-books included in the detected category; and
enlarging the touched category,
wherein the enlarging of the touched category and the displaying of the at least one of the one or more e-books comprises:
identifying, when multi-touches to one or more categories are detected, a number of multi-touched one or more categories;
enlarging, when the multi-touches to one category are detected, the one category;
enlarging, when the multi-touches to two or more categories are detected, a category having the largest number of e-books among the multi-touched categories;
displaying at least one of the one or more e-books included in the enlarged category; and
displaying, when an e-book is selected by a single touch during the displaying of the e-books included in the enlarged category, the selected e-book through an execution of an e-book viewer, and
wherein the detected kind of shift of the portable terminal includes at least one of an inclination, an up, down, left or right movement, and a rotation of the portable terminal.

12. The method as claimed in claim 11, wherein the categories of e-books are displayed on a virtual bookshelf, and each category is separately displayed using a book box on the virtual bookshelf.

13. The method as claimed in claim 11, further comprising:
setting a corresponding category at a corresponding position by the user; and
modifying or deleting the position and a title of the set category according to a selection of the user.

14. The method as claimed in claim 11, further comprising displaying a title of a corresponding category at a position of the corresponding category.

15. The method as claimed in claim 11, wherein a size of each category is the same or is varied according to a number of the one or more e-books included in the respective category.

16. The method as claimed in claim 11, wherein the searching for the e-book by displaying and the scrolling through the categories of e-books comprises:
displaying, when an inclination of the portable terminal is detected, and scrolling through categories of e-books, which are not displayed on the display unit of the portable terminal when the inclination of the portable terminal is detected, according to a direction and a speed of the detected inclination of the portable terminal;
displaying, when a movement of the portable terminal is detected, and scrolling through categories of e-books, which are not displayed on the display unit of the portable terminal when the movement of the portable terminal is detected, according to a direction and a speed of the detected movement of the portable terminal, wherein the speed at which the e-books are displayed and scrolled according to the detected movement of the portable terminal is greater than the speed at which the e-books are displayed and scrolled according to the detected inclination of the portable terminal; and
displaying, when a rotation of the portable terminal is detected, different categories of e-books, which are not displayed on the display unit of the portable terminal when the rotation of the portable terminal is detected, according to a direction of the detected rotation of the portable terminal.

17. The method as claimed in claim 11, further comprising enlarging the touched category,
wherein the enlarging of the touched category and the displaying of the at least one of the one or more e-books included in the enlarged category comprises:
displaying, when a single touch of the corresponding category or a title of the corresponding category is detected, a list of e-books included in the single-touched category; and
displaying, when an e-book is selected from the list of e-books, the selected e-book through an execution of an e-book viewer.

18. The method as claimed in claim 11, further comprising displaying and scrolling, when a shift of the portable terminal is detected during the displaying of the at least one of the one or more e-books included in the detected category, through different categories of e-books, which are not displayed on the display unit of the portable terminal when the shift of the portable terminal is detected, according to a direction of the detected shift of the portable terminal.

* * * * *